US011971048B2

(12) United States Patent
Choi et al.

(10) Patent No.: US 11,971,048 B2
(45) Date of Patent: Apr. 30, 2024

(54) IMPELLER

(71) Applicant: LG ELECTRONICS INC., Seoul (KR)

(72) Inventors: Hakkyu Choi, Seoul (KR); Seungjo Baek, Seoul (KR); Jeongho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/909,960

(22) PCT Filed: Mar. 11, 2021

(86) PCT No.: PCT/KR2021/003010
§ 371 (c)(1),
(2) Date: Sep. 7, 2022

(87) PCT Pub. No.: WO2021/182883
PCT Pub. Date: Sep. 16, 2021

(65) Prior Publication Data

US 2023/0120338 A1 Apr. 20, 2023

(30) Foreign Application Priority Data

Mar. 12, 2020 (KR) ........................ 10-2020-0030874

(51) Int. Cl.
*F04D 29/28* (2006.01)
*F04D 29/30* (2006.01)
(Continued)

(52) U.S. Cl.
CPC ........... *F04D 29/284* (2013.01); *F04D 29/30* (2013.01); *F04D 29/023* (2013.01);
(Continued)

(58) Field of Classification Search
CPC ...... F04D 29/284; F04D 29/281; F04D 29/30; F04D 29/624; F04D 29/626; F04D 29/441; F04D 29/023
See application file for complete search history.

(56) References Cited

U.S. PATENT DOCUMENTS 4,720,242 A * 1/1988 Lovisetto ........... F04D 29/2222 416/186 A
5,133,643 A 7/1992 Ortolano
(Continued)

FOREIGN PATENT DOCUMENTS

KR 10-2014-0028934 3/2014
KR 10-2015-0033441 4/2015
(Continued)

OTHER PUBLICATIONS

International Search Report (with English Translation) dated Jun. 17, 2021 issued in Application No. PCT/KR2021/003010.

*Primary Examiner* — Justin D Seabe
*Assistant Examiner* — Behnoush Haghighian
(74) *Attorney, Agent, or Firm* — KED & ASSOCIATES

(57) ABSTRACT

The present invention relates to an impeller comprising: a shroud having a plurality of spiral upper slot units formed therein; a hub located to face the shroud; and a plurality of blades connected to the hub and inserted into the upper slot units to be coupled to the shroud, wherein the blade includes a body portion formed to be inclined to one side and an upper end portion, which is bent upward from the body portion and has a second concave surface formed in one side and a second convex surface formed on the other side thereof, and the upper slot unit includes an upper slot bottom for forming a space in which the upper end portion is inserted; an upper slot wall divided into a first upper slot wall located at the second concave surface side and a second upper slot wall located at the second convex surface side;
(Continued)

and a second inclined surface formed to be inclined from the first upper slot wall so as to face the second concave surface. Thus, the impeller secures the assembling of the blades and has the effect of reducing the possibility of separation of the blades during the high-speed rotation of the impeller, which improves the structural rigidity of the impeller.

19 Claims, 7 Drawing Sheets

(51) Int. Cl.
*F04D 29/02* (2006.01)
*F04D 29/44* (2006.01)
*F04D 29/62* (2006.01)

(52) U.S. Cl.
CPC .......... *F04D 29/281* (2013.01); *F04D 29/441* (2013.01); *F04D 29/626* (2013.01); *F05D 2210/12* (2013.01); *F05D 2300/173* (2013.01)

(56) References Cited

U.S. PATENT DOCUMENTS

| | | | | |
|---|---|---|---|---|
| 5,558,499 | A * | 9/1996 | Kobayashi | F04D 29/30 416/241 A |
| 6,146,094 | A * | 11/2000 | Obana | F04D 29/281 415/200 |
| 6,712,593 | B2 * | 3/2004 | Takahashi | F04D 29/281 425/127 |
| 6,805,531 | B2 * | 10/2004 | Iida | F04D 29/281 416/185 |
| 8,007,240 | B2 * | 8/2011 | Sanagi | F04D 29/282 416/213 A |
| 8,342,809 | B2 * | 1/2013 | Hezari | F03B 3/125 416/214 R |
| 8,426,766 | B2 * | 4/2013 | Tsukamoto | F01D 5/048 29/889 |
| 8,727,729 | B2 * | 5/2014 | Noronha | F04D 29/023 416/186 R |
| 8,732,948 | B2 * | 5/2014 | Nishino | F04D 29/626 29/889.3 |
| 8,793,872 | B2 * | 8/2014 | Adachi | B29C 66/301 264/405 |
| 10,001,144 | B2 * | 6/2018 | Shen | F04D 29/626 |
| 10,309,412 | B2 * | 6/2019 | Kurihara | F24F 1/0022 |
| 10,584,712 | B2 * | 3/2020 | Ishikawa | F04D 29/284 |
| 2002/0051707 | A1 * | 5/2002 | Takahashi | B29C 45/0062 416/186 R |
| 2007/0098556 | A1 * | 5/2007 | Sanagi | F04D 29/30 416/182 |
| 2009/0047133 | A1 * | 2/2009 | Nishino | F04D 29/281 416/213 A |
| 2009/0095719 | A1 * | 4/2009 | Tsukamoto | B23K 26/28 219/121.64 |
| 2010/0170634 | A1 * | 7/2010 | Nishino | B29C 66/836 156/380.9 |
| 2010/0242280 | A1 * | 9/2010 | Adachi | F04D 29/2227 29/889.7 |
| 2010/0316498 | A1 * | 12/2010 | Cahill | F04D 29/281 416/189 |
| 2010/0329871 | A1 * | 12/2010 | Cahill | F04D 29/626 416/187 |
| 2011/0318183 | A1 * | 12/2011 | Noronha | F04D 29/281 416/189 |
| 2013/0276303 | A1 * | 10/2013 | Nishino | F04D 29/281 29/889.7 |
| 2015/0071781 | A1 * | 3/2015 | Kurihara | F01D 25/06 416/186 R |
| 2015/0204352 | A1 * | 7/2015 | Shen | F04D 29/626 417/423.15 |
| 2015/0300367 | A1 * | 10/2015 | Lee | F04D 29/053 415/206 |
| 2016/0115967 | A1 * | 4/2016 | Kurihara | F24F 1/0022 416/189 |
| 2016/0341210 | A1 * | 11/2016 | Ishikawa | F04D 29/08 |

FOREIGN PATENT DOCUMENTS

| | | |
|---|---|---|
| KR | 10-2018-0130930 | 12/2018 |
| KR | 10-2019-0096219 | 8/2019 |

* cited by examiner

IMPELLER

CROSS-REFERENCE TO RELATED PATENT APPLICATIONS

This application is a U.S. National Stage Application under 35 U.S.C. § 371 of PCT Application No. PCT/KR2021/003010, filed Mar. 11, 2021, which claims priority to Korean Patent Application No. 10-2020-0030874, filed Mar. 12, 2020, whose entire disclosures are hereby incorporated by reference.

TECHNICAL FIELD

The present disclosure relates to an impeller. More particularly, the present disclosure relates to an impeller having an inclined surface formed on a slot part to improve assemblability of a blade, reduce the possibility of separation of the blade during a high-speed rotation, and to increase structural rigidity.

BACKGROUND ART

In general, a chiller, which is used for heat exchange between cold water and cooling water by using a refrigerant, cools or removes heat from cold water via heat exchange between a refrigerant circulating in the chiller and cold water circulating between a demand source of the cold water and the chiller. Such a chiller is used for the purpose of large-scale air conditioning, and thus, stable device operation is required.

Main components of the conventional chiller system are a compressor, a condenser, an expansion valve, and an evaporator.

A compressor, which is a device for compressing gas such as air and refrigerant gas, is configured to compress a refrigerant to be transferred to a condenser.

An impeller used in a compressor compresses air through a process of accelerating air introduced in the axial direction through a shroud and discharging the air in the radial direction through a space between blades. Such an impeller is made of a synthetic resin or a metal material.

The conventional methods of manufacturing an impeller include a brazing method, which is a process of coupling a module in which a shroud, a hub, and a blade are integrally formed by an adhesive, and a casting method, which is a process of making casts. In addition, an impeller (hereinafter referred to as a "sheet metal impeller") can be manufactured by assembling blades of sheet metal into slots formed in a shroud and a hub and then bonding them together through adhesion or welding.

Meanwhile, a sheet metal impeller manufactured in a prefabricated manner has a difficulty in applying to an impeller rotating at a high speed.

FIG. 1 shows the results of stress concentration and structural analysis of the conventional sheet metal impeller rotating at a high speed of 14,000 rpm. Referring to FIG. 1, when the impeller rotates, stress due to a blade is intensively applied to slots (dotted lines) formed in a hub and a shroud. The stress was most concentrated at an outer end of the slot on the shroud side due to centrifugal force and thermal deformation caused by heat conduction from a motor.

As a sheet metal impeller is coupled by inserting a blade into a slot, the blade assembled into the slot can be easily separated from a hub and/or a shroud, or can be easily damaged during a high speed rotation of 14,000 rpm to 15,000 rpm or higher, and the shroud can often be broken mostly due to the slot with weak rigidity owing to the thinner thickness than other parts.

DISCLOSURE OF INVENTION

Technical Problem

It is an objective of the present disclosure to prevent blades from being separated from a structure of an impeller caused by a high-speed rotation of the impeller.

It is another objective of the present disclosure to increase structural rigidity of an impeller.

The objectives of the present disclosure are not limited to the objectives described above, and other objectives not stated herein will be clearly understood by those skilled in the art from the following description.

Technical Solution

According to an aspect of the subject matter described in this application, an impeller includes a shroud provided with a plurality of upper slots of a spiral shape, a hub disposed opposite the shroud, and a plurality of blades connected to the hub and inserted into the respective plurality of upper slots to be coupled to the shroud.

The plurality of blades may each include a body inclined to a first side, and an upper edge bent upward from the body to define a second concave surface on a second side thereof and a second convex surface on a first side thereof.

The plurality of upper slots may each include an upper slot bottom defining a space into which the upper edge is inserted, an upper slot wall divided into a first upper slot wall disposed on a second concave surface side and a second upper slot wall disposed on a second convex surface side, and a second inclined surface inclined from the first upper slot wall to face the second concave surface.

A distance between the second inclined surface and the upper edge may gradually increase downward.

The upper slot wall and the upper edge may be spaced apart from each other by a predetermined interval.

A distance between the first upper slot wall and the upper edge may be greater than a distance between the second upper slot wall and the upper edge.

The distance between the first upper slot wall and the upper edge may gradually decrease downward.

The distance between the second upper slot wall and the upper edge may gradually increase upward.

The distance between the first upper slot wall and the upper edge may be less than or equal to 0.25 mm.

The distance between the second upper slot wall and the upper edge may be less than or equal to 0.2 mm.

The hub may be provided with a plurality of lower slots of a spiral shape. The plurality of blades may each include a lower edge bent downward from the body to define a first concave surface on a first side thereof and a first convex surface on a second side thereof, the lower edge being inserted into one of the plurality of lower slots to be coupled to the hub.

The plurality of lower slots may each include a lower slot bottom defining a space into which the lower edge is inserted, lower slot wall divided into a first lower slot wall disposed on a first concave surface side and a second lower slot wall disposed on a first convex surface side, and a first inclined surface inclined from the first lower slot wall to face the first concave surface.

A distance between the first inclined surface and the lower edge may gradually increase upward.

The lower slot wall and the lower edge may be spaced apart from each other by a predetermined interval.

A distance between the first lower slot wall and the lower edge may be greater than a distance between the second lower slot wall and the lower edge.

The distance between the first lower slot wall and the lower edge may gradually decrease upward.

The distance between the second lower slot wall and the lower edge may gradually increase toward upward.

The distance between the first lower slot wall and the lower edge may be less than or equal to 0.25 mm.

The distance between the second lower slot wall and the lower edge may be less than or equal to 0.2 mm.

A thickness of the shroud may be greater than a thickness of each of the plurality of blades.

The thickness of the shroud may be at least twice the thickness of each of the plurality of blades.

A depth of each of the plurality of upper slots may be less than or equal to half a thickness of the shroud.

The shroud may have a minimum thickness of 1.6 mm or more.

The shroud may include at least one or more ribs spaced apart from each other in a circle on an upper surface thereof.

The shroud may include a shroud body defining a body of the shroud, and an inlet portion through which air is introduced.

The inlet portion may have a thickness greater than a thickness of the shroud body.

The inlet portion may become thicker toward the shroud body.

The shroud may be made of an AL7075-T6 material.

Details of other embodiments are included in the detailed description and the accompanying drawings.

Advantageous Effects

An impeller according to the present disclosure has one or more of the following effects.

First, as a first inclined surface and a second inclined surface are provided, interference may be prevented when inserting a blade of a three-dimensional shape into a slot part, allowing the blade to be completely or fully inserted into the slot part to thereby prevent the separation of the blade from an impeller even during a high-speed rotation.

Second, the critical value (threshold) of yield strength at which an impeller is permanently deformed or fractured caused by a high-speed rotation and allowable stress may be increased.

The effects of the present disclosure are not limited to the effects described above, and other effects not mentioned will be clearly understood by those skilled in the art from the claims.

MODE FOR INVENTION

Figure 1:
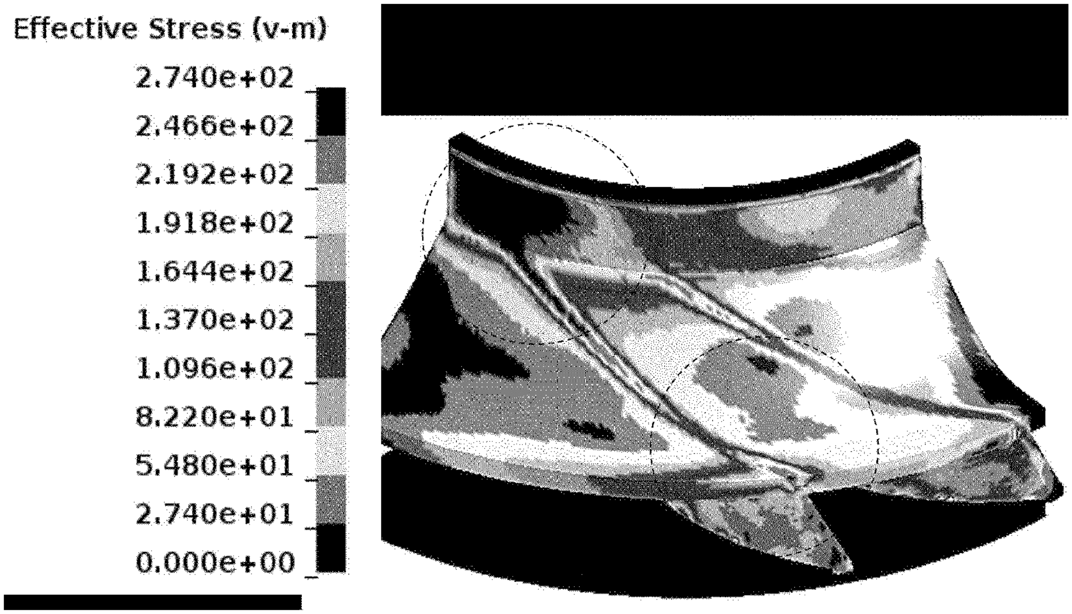
FIG. 1 shows the concentration of stress acting on a sheet metal impeller during a high-speed rotation.

The above and other aspects, features and other advantages of the present disclosure will be more clearly understood from the following detailed description taken in conjunction with the accompanying drawings. Exemplary embodiments will now be described more fully hereinafter with reference to the accompanying drawings; however, they may be embodied in many different forms and should not be construed as limited to the embodiments set forth herein. Rather, these embodiments are provided so that this disclosure will be thorough and complete, and will fully convey the scope of the exemplary embodiments to those skilled in the art. The same reference numerals are used throughout the drawings to designate the same or similar components.

Spatially relative terms, such as, "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated at other orientations) and the spatially relative terms used herein interpreted accordingly.

The terminology used herein is for the purpose of describing particular embodiments only and is not intended to limit the full scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, and/or operations, but do not preclude the presence or addition of one or more other components, steps, and/or operations.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In the drawings, the thickness or size of each component is exaggerated, omitted, or schematically shown for the sake of convenience and clarity. Also, the size and area of each component do not entirely reflect the actual size or area thereof.

Hereinafter, an impeller according to embodiments of the present disclosure will be described with reference to the accompanying drawings.

Figure 2:
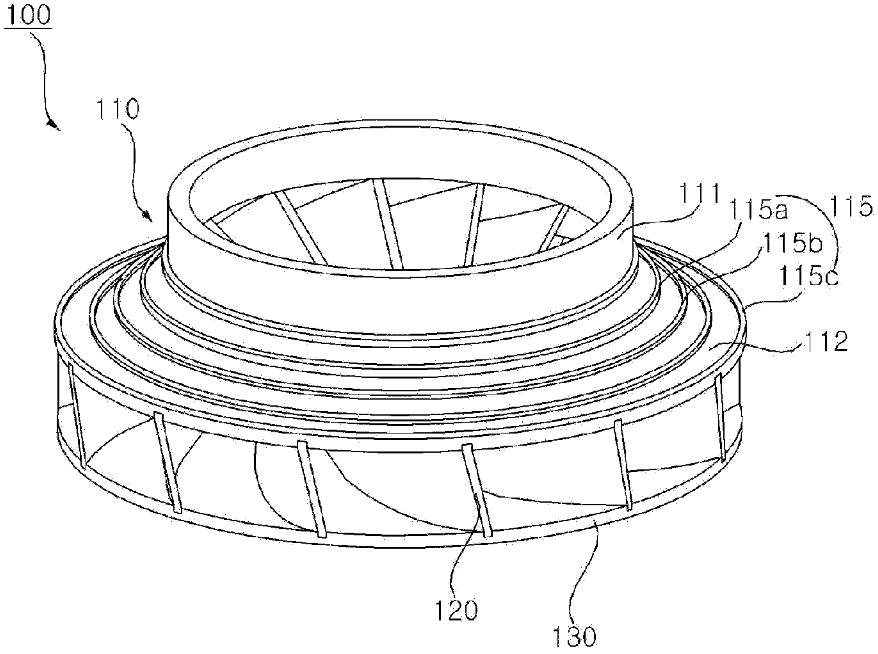
FIG. 2 is a perspective view of an impeller according to an embodiment of the present disclosure.
Figure 3:
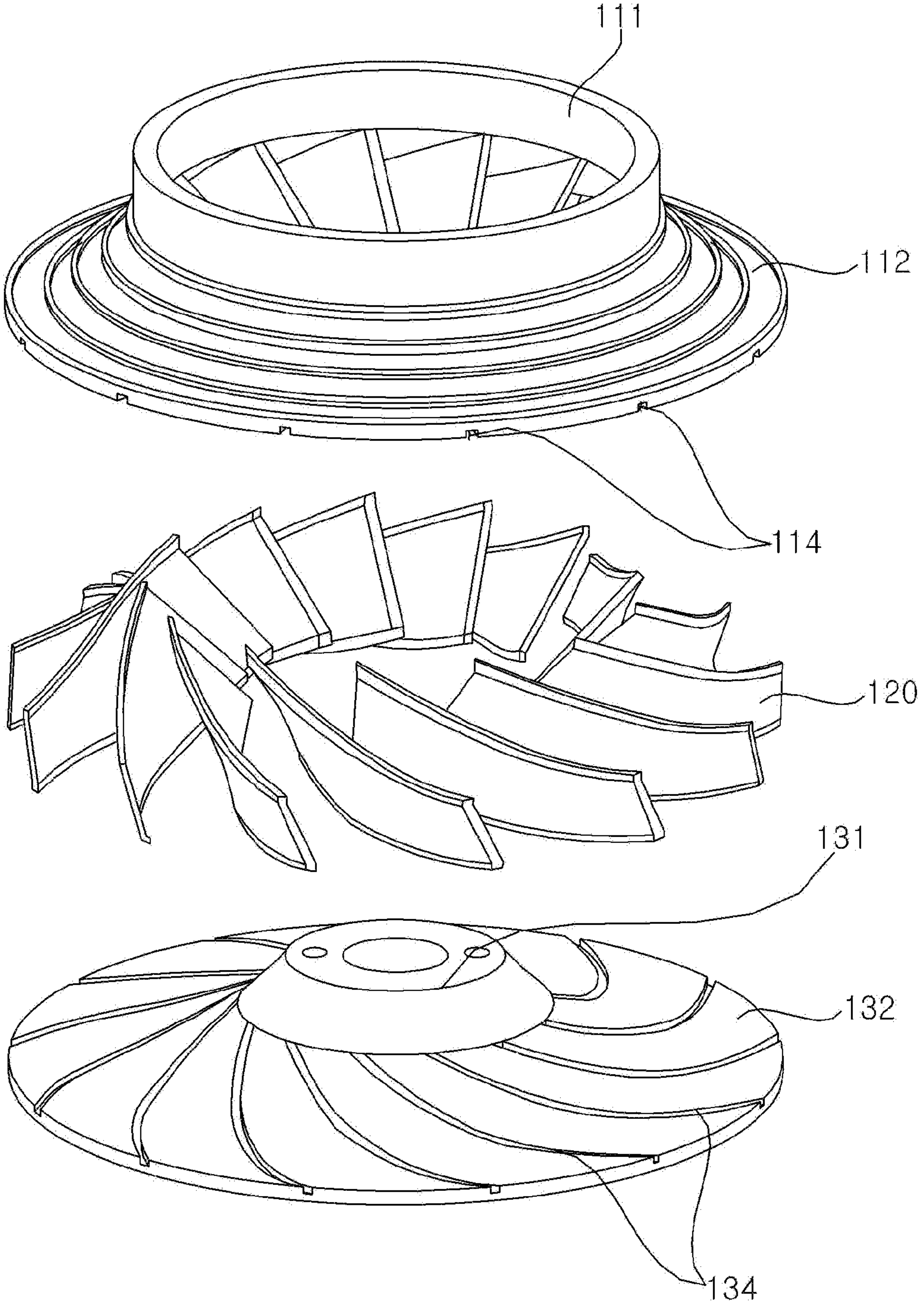
FIG. 3 is an exploded perspective view of the impeller of FIG. 2.

FIGS. 2 and 3 illustrate an impeller 100 according to an embodiment of the present disclosure. FIG. 2 is a perspective view of the impeller 100, and FIG. 3 is an exploded perspective view of the impeller 100.

As shown in the drawings, the impeller 100 according to the embodiment of the present disclosure may include a shroud 110, a hub 130, and a plurality of blades 120.

The shroud 110, the blade 120, and the hub 130 may be manufactured separately, and then the plurality of blades 120 may be coupled to the shroud 110 and the hub 130.

The shroud 110, the hub 130, and the plurality of blades 120 of the impeller 100 may be made of a metal material having plasticity. For example, the shroud 110, the hub 130, and the plurality of blades 120 may be made of an aluminum alloy.

Hereinafter, the shroud 110 according to an embodiment of the present disclosure will be described with reference to FIGS. 2 and 3.

The impeller 100 may be formed such that the shroud 110 and the hub 130 are disposed opposite each other, and the plurality of blades 120 are coupled between the shroud 110 and the hub 130. First sides of the plurality of blades 120 may be coupled to a lower surface of the shroud 110, and second sides of the plurality of blades 120 may be coupled to an upper surface of the hub 130.

The shroud 110 and the hub 130 may each have a circular shape to be suitable for rotating about a rotating shaft (not shown) to which a motor is connected. The plurality of blades 120 may be coupled to the shroud 110 and the hub 130 to define a flow path of a fluid discharged after being compressed through the impeller 100.

The shroud 110 is disposed to be spaced apart from the hub 130. The shroud 110 is formed in a circular ring shape to have an inlet portion 111 at its center, and includes the inlet portion 111 and a shroud body 112.

The inlet portion 111 may be formed such that air is introduced in a direction of the rotating shaft (not shown). The inlet portion 111 may have a shape raised at the center, from the shroud body 112 toward a direction in which a fluid is introduced.

The shroud body 112 supports an upper end portion or upper edge 126 of each of the plurality of blades 120. The shroud body 112 gradually increases from its inner circumference defining the inlet portion 111 in a radial direction to have a maximum diameter at its outer circumference through which a flow of air pressurized by the plurality of blades 120 is discharged.

The shroud body 112 may form a curved surface having an inner surface to which a fluid is guided convexly or outwardly curved toward the hub 130. Accordingly, the shroud 110 may allow a fluid flow to be smooth, thereby minimizing energy loss due to the fluid flow.

An upper slot unit or upper slot 114 of a helical or spiral shape may be provided in plurality on a lower surface of the shroud body 112. The upper slot 114 may be engraved into the surface of a lower end of the shroud body 112.

The upper slot 114 formed in the shroud 110 may have the same spiral shape as the blade 120. Accordingly, the shroud 110 may be coupled to the plurality of blades 120 in a manner that a first side of one blade 120 is seated in one upper slot 114.

The shroud 110 may have higher strength than the blade 120 and hub 130.

When the impeller 100 rotates, the shroud 110 may receive a greater pressure than the blade 120 and the hub 130 due to a fluid introduced into the impeller 100. Therefore, a material constituting the shroud 110 should have higher strength than materials constituting the blade 120 and the hub 130.

For example, the shroud 110 may be made of an AL7075-T6 alloy, and the blade 120 and hub 130 may be made of an AL6061-T6 alloy. However, the material of the shroud 110, the blade 120, and the hub 130 is not limited thereto.

The AL6061-T6 alloy, which is a precipitation hardening alloy, is one of the heat-treated alloys. The AL6061-T6 alloy has excellent corrosion resistance, weldability, and excellent extrusion processability.

The AL7075-T6 alloy, which is one of the highest strength alloys of all the aluminum alloys, has a higher strength than the AL6061-T6 alloy.

As a material with a higher strength is used for the shroud 110 to which a strong pressure is applied, the durability of the impeller 100 may be improved.

Meanwhile, the shroud 110 may be formed by numerical control (NC) machining. The NC machining controls machining conditions by means of a computer device. Since the NC machining is controlled by a program, the NC machining is suitable for machining complex shapes.

To this end, an NC machining device with a dedicated program for shape machining of the shroud 110 may be used.

Further, various processing methods such as sheet metal processing may be used to produce the shroud 110.

Referring to the drawings, the shroud 110 may include at least one or more ribs 115 formed on an upper surface of the shroud body 112. The at least one or more ribs 115 may be provided to be spaced apart from each other in a circle on the upper surface of the shroud body 112.

The rib 115 may be made of the same metal material as the shroud body 112, and may be integrally formed with the shroud body 112. When the rib 115 is provided, the strength of the shroud 110 may be enhanced. Accordingly, the durability of the impeller 100 may be improved.

The at least one or more ribs 115 may be formed such that a thickness or height increases as a distance from the inlet portion 111 of the shroud 110 decreases. Alternatively, the at least one or more ribs 115 may have the same thickness or height.

A cross-section of the rib 115 may be a semi-circle or a semi-ellipse. As the rib 115 is formed on the upper surface of the shroud body 112, the shape of the rib 115 does not affect the performance of the impeller 100. Accordingly, in some embodiments, the cross-section of the rib 115 may have various shapes such as a triangle, a quadrangle, and the like.

Hereinafter, the hub 130 according to an embodiment of the present disclosure will be described with reference to FIGS. 2 and 3.

The hub 130 rotates about the rotating shaft (not shown) by a motor (not shown). In some embodiments, the hub 130 may be directly connected to the rotating shaft (not shown) of the motor (not shown).

The hub 130 is disposed to be spaced apart from the shroud 110. The hub 130 is formed in a circular ring shape, gradually increases from its inner circumference defining a shaft connecting portion 131 in the radial direction, and has a maximum diameter at its outer circumference through which a flow of air pressurized by the blade 120 is discharged.

The hub 130 may include a blade support plate 132 that supports a lower edge 124 of the blade 120, and the shaft connecting portion 131 that is raised at a center thereof, from the blade support plate 132 toward the shroud 110.

The shaft connecting portion 131 has a predetermined curvature to extend from the blade support plate 132. The shaft connecting portion 131 may be provided at its center with a hole to be coupled to the rotating shaft (not shown) of the motor (not shown), and the shaft connecting portion 131 may be provided with a plurality of fastening holes (not shown) disposed at regular intervals in a circumferential direction along a circumference of the hole. As fastening members, such as nuts, bolts, and screws, are fastened through the fastening holes, the hub 130 may be connected and fixed to the rotating shaft (not shown).

A lower slot unit or lower slot 134 of a helical or spiral shape may be provided in plurality on the blade support plate 132 of the hub 130. The lower slot 134 may be engraved into the surface of the blade support plate 132.

The lower slot 134 may have the same spiral shape as the blade 120.

Accordingly, the hub 130 may be coupled to the plurality of blades 120 in a manner that a first side of one blade 120 is seated in one lower slot 134.

Meanwhile, the hub 130 may be formed by numerical control (NC) machining. To this end, an NC machining device with a dedicated program for shape machining of the hub 130 may be used.

Further, various processing methods such as sheet metal processing may be used to produce the hub 130.

Hereinafter, the blade 120 according to an embodiment of the present disclosure will be described with reference to FIGS. 2 to 4.

Figure 4:
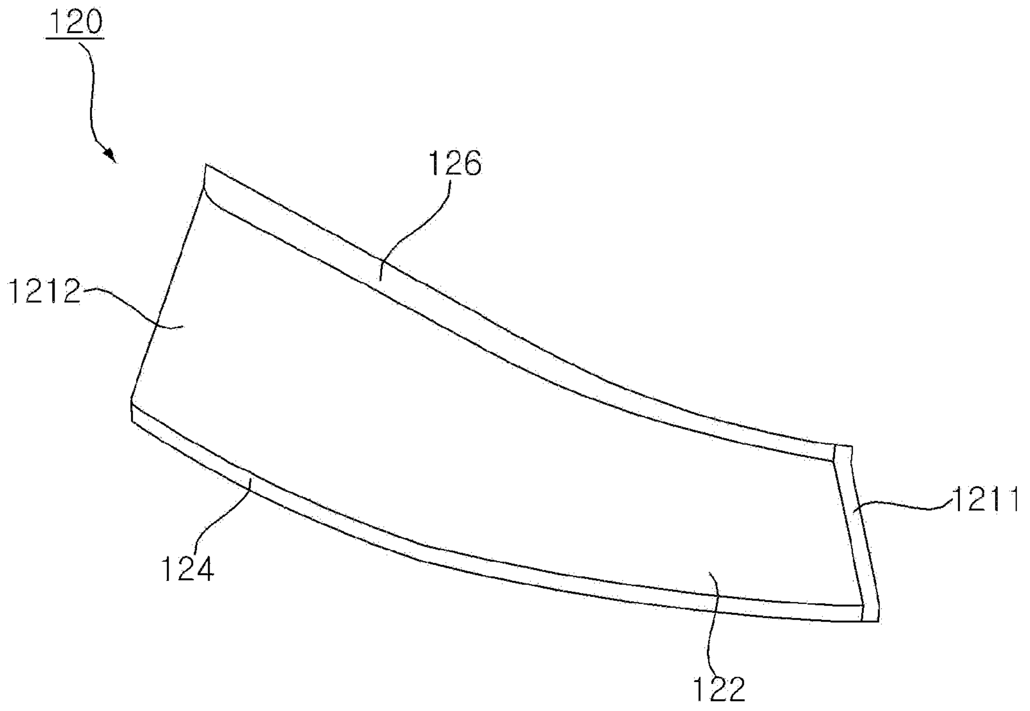
FIG. 4 illustrates a structure of a blade shown in FIG. 2.

Referring to FIG. 4, the blade 120 may include a body portion or body 122, a front edge 1211, a rear edge 1212, the upper edge 126, and the lower edge 124.

The upper edge 126 may have the same spiral shape as the upper slot 114 of the shroud 110 to be seated in and coupled to the upper slot 114.

The lower edge 124 may have the same spiral shape as the lower slot 134 of the hub 130 to be seated in and coupled to the lower slot 134.

The lower edge 124 may be inserted and coupled into the lower slot 134, and the upper edge 126 may be inserted and coupled into the upper slot 114.

The coupling may be achieved by welding. The welding, which is performed at a temperature of 450 degrees or higher, is a joining process performed at a temperature above a melting point of a base metal to be joined. However, the coupling may be achieved by brazing, which is a joining process performed at a temperature of 450 degrees or higher and at a temperature below a melting point of a base metal, but is not limited thereto.

Meanwhile, the blade 120 may be formed by press working or sheet metal processing of a metal plate. The sheet metal processing is a method of metal processing to make a product of a desired shape through operations such as bending, folding, punching, and cutting.

In detail, the blade 120 may be formed by press-molding a plastic metal plate. An aluminum alloy is easy to form into various shapes, and can achieve corrosion resistance, heat resistance, rigidity, and the like depending on the content ratio of the materials constituting the alloy.

For example, the blade 120 may be made of an AL6061-T6 alloy. The AL6061-T6 alloy has excellent extrusion workability to make it suitable for sheet metal processing.

Accordingly, the blade 120 may achieve not only sufficient rigidity, but also a complex shape for improving the performance of the impeller 100.

Meanwhile, the blade 120 may be formed by various processing methods such as numerical control (NC) machining.

The impeller 100 may include a plurality of blades 120. The plurality of blades are coupled to the shroud 110 and the hub 130.

The blade 120 may be provided in plurality to be disposed between the hub 130 and the shroud 110 along the circumferential direction. In detail, the plurality of blades 120 may be disposed to be spaced apart from one another at predetermined intervals with respect to the rotating shaft (not shown).

Together with the lower surface of the shroud 110 and the upper surface of the hub 130, bodies 122 of two adjacent blades 120 may form a flow path for a fluid discharged from the impeller 100.

The blade 120 may be provided in plurality to be disposed between the hub 130 and the shroud 110 along the circumferential direction. In detail, the plurality of blades 120 may be disposed to be spaced apart from one another at predetermined intervals with respect to the rotating shaft (not shown).

The blade 120 may have a bent shape based on a rotational direction in order to transfer rotational kinetic energy generated by the impeller 100 to a fluid. A fluid sucked through the inlet portion 111 of the shroud 110 flows from the front edge (FE) 1211 to the rear edge (RE) 1212 of the blade 120 and is then discharged.

Figure 5:
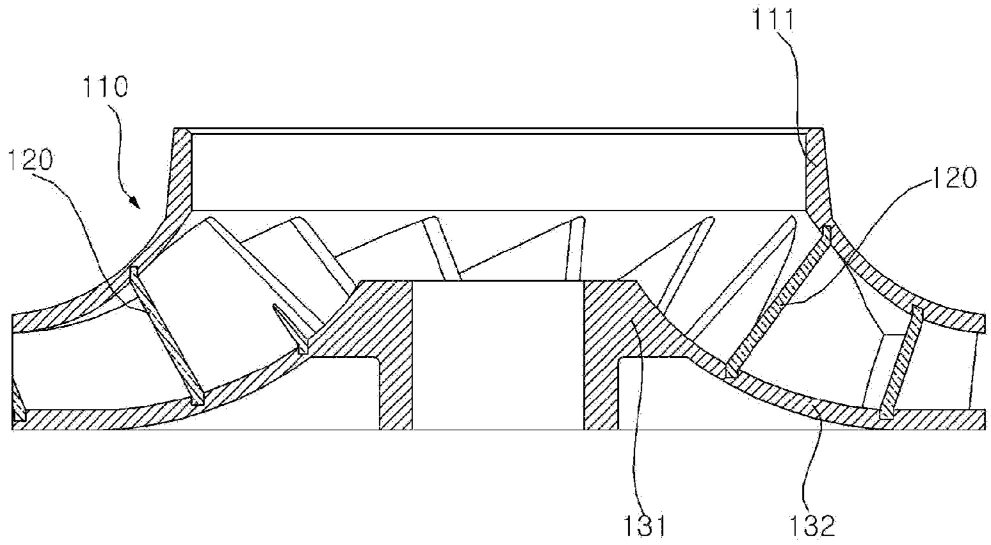
FIG. 5 is a cross-sectional view illustrating a cross-section of the impeller of FIG. 2 cut from one side.
Figure 6:
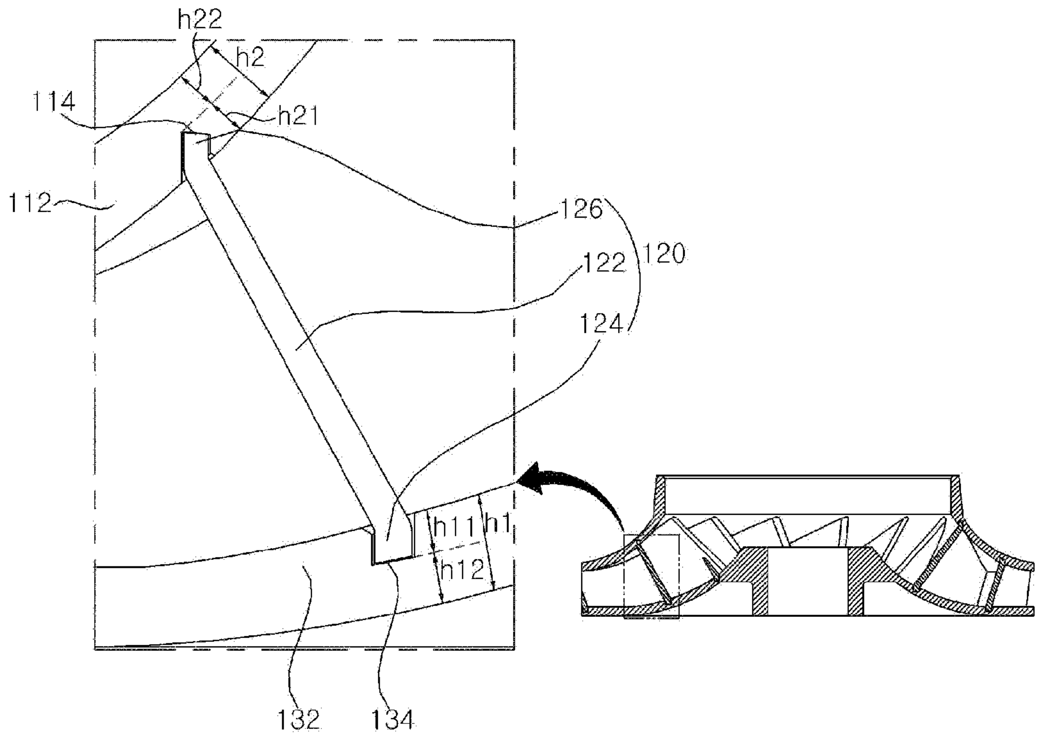
FIG. 6 is an enlarged cross-sectional view of a blade in the cross-section of the impeller shown in FIG. 5.

FIGS. 5 and 6 show a cross-section of an impeller 100 according to an embodiment of the present disclosure. FIG. 5 is a cross-sectional view illustrating a cross section of the impeller 100 viewed from one side, and FIG. 6 is an enlarged cross-sectional view of a blade 120 in the cross section of FIG. 5.

Figure 7:
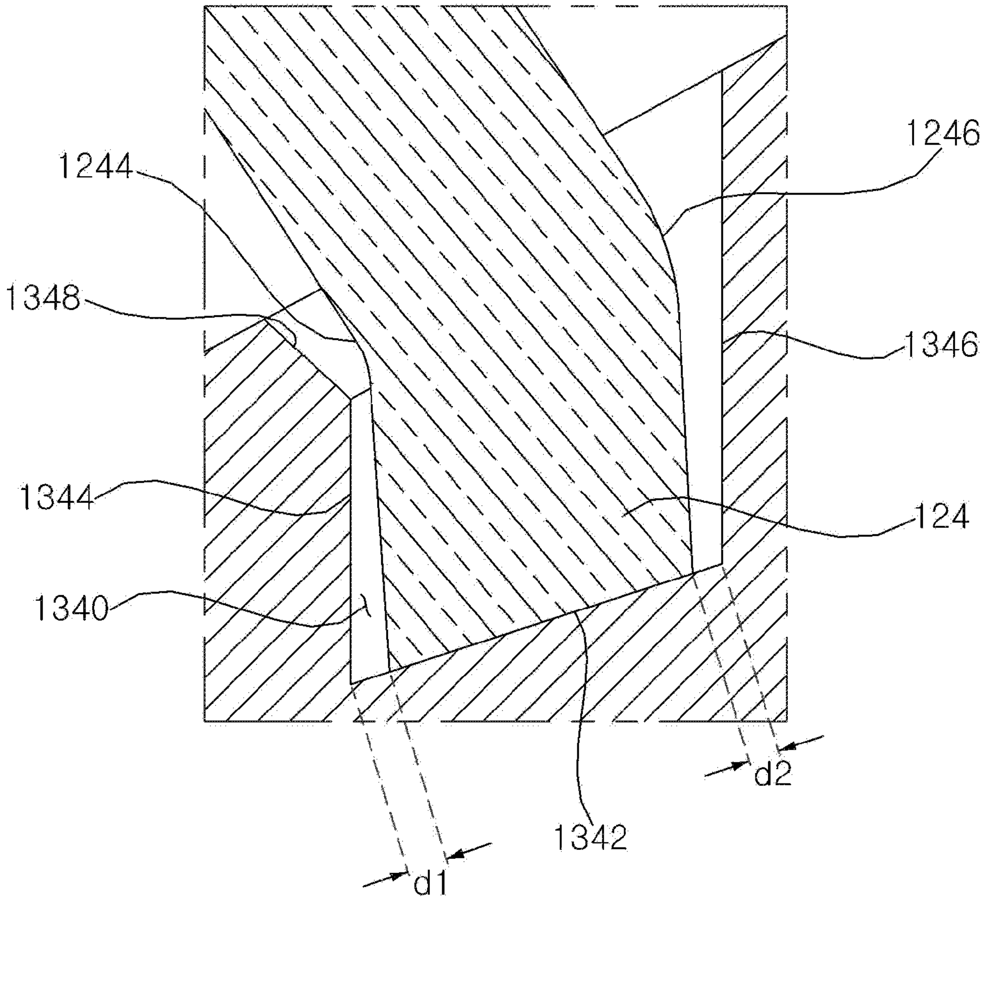
FIG. 7 is an enlarged cross-sectional view illustrating a lower edge of the blade of FIG. 6.
Figure 8:
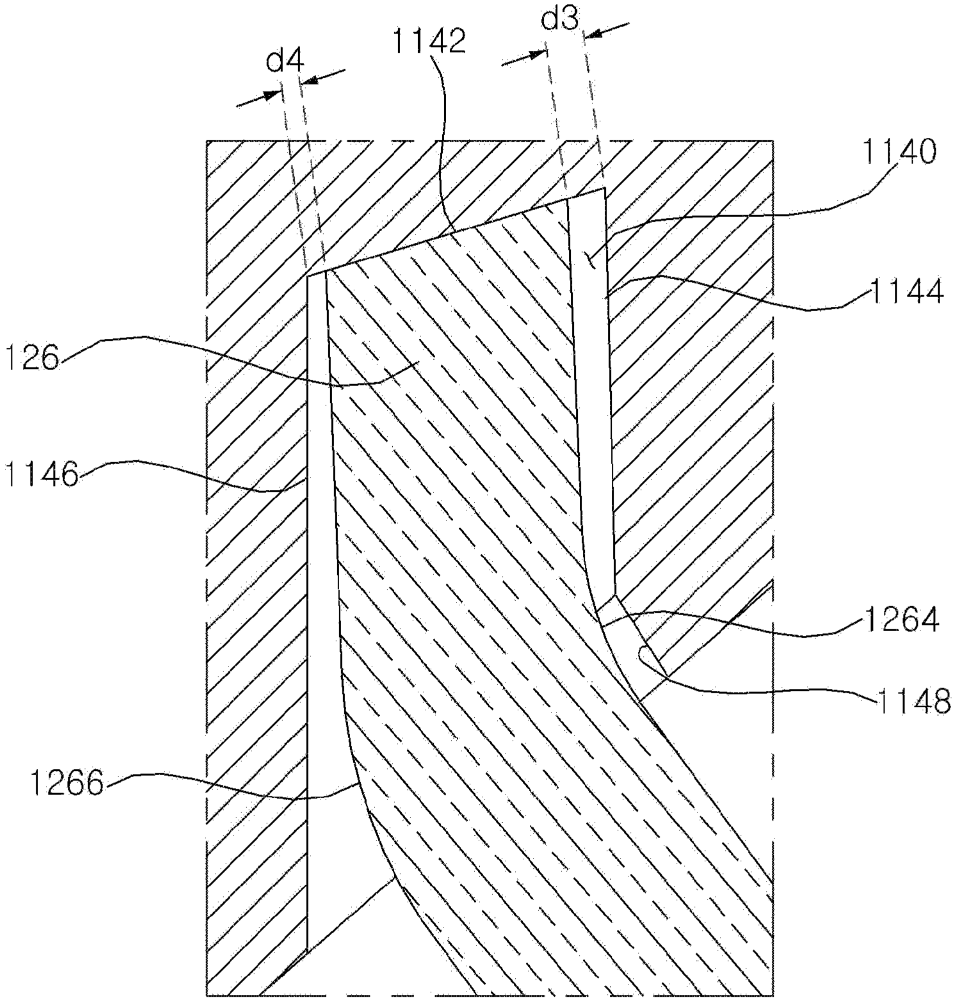
FIG. 8 is an enlarged cross-sectional view illustrating an upper edge of the blade of FIG. 6.

FIG. 7 is an enlarged cross-sectional view illustrating a lower edge 124 side of the blade 120 shown in FIG. 6. FIG. 8 is an enlarged cross-sectional view of an upper edge 126 side of the blade 120 shown in FIG. 5.

Hereinafter, with reference to FIGS. 5 to 8, the blade 120, the hub 130 and the shroud 110 according to an embodiment of the present disclosure will be described.

The blade 120 includes a body 122, a lower edge 124, and an upper edge 126.

The body 122 may be inclined to a first side.

The lower edge 124 may be bent downward from the body to form a first concave surface 1244 on a first side thereof and a first convex surface 1246 on a second side thereof. The first concave surface 1244 may be a first surface of the blade 120 connecting the lower edge 124 and the body 122, and the first convex surface 1246 may be a second surface of the blade 120 connecting the lower edge 124 and the body 122.

The upper edge 126 may be bent upward from the body to form a second concave surface 1264 on a second side thereof and a second convex surface 1266 on a first side thereof. The second concave surface 1264 may be a second surface of the blade 120 connecting the upper edge 126 and the body 122, and the second convex surface 1266 may be a first surface of the blade 120 connecting the the upper edge 126 and the body 122.

The lower slot 134 may define a lower slot groove 1340 that is a space into which the lower edge 124 of the blade 120 is inserted. The lower slot 134 may include a lower slot bottom 1342 and lower slot walls 1344 and 1346, which are formed by engraving the upper surface of the hub 130 to define the lower slot groove 1340.

The lower slot walls 1344 and 1346 may be divided into a first lower slot wall 1344 disposed on the first concave surface side and a second lower slot wall 1346 disposed on the first convex surface side.

The upper slot 114 may define a second slot groove 1140 that is a space into which the upper edge 126 of the blade 120 is inserted. The upper slot 114 may include an upper slot bottom 1142 and upper slot walls 1144 and 1146, which are formed by engraving the lower surface of the shroud 110 to define the second slot groove 1140.

The upper slot walls 1144 and 1146 may be divided into a first upper slot wall 1144 disposed on the second concave surface side and a second upper slot wall 1146 disposed on the second convex surface side.

Meanwhile, when assembling the blade 120 having a spiral shape or a 3D shape to the lower slot 134 and the upper slot 114, interference may occur at an edge formed by meeting of the lower slot wall 1344, 1346 and the upper surface of the hub 130, and an edge formed by meeting of the upper slot wall 1144, 1146 and the lower surface of the shroud 110. The interference causes a decrease in insertion depths of the upper edge 126 and the lower edge 124 of the blade 120, and a reduction in assemblability. This increases a separation possibility of the blade 120 from the impeller 100 caused by stress due to centrifugal force and thermal deformation during a high-speed rotation of the impeller.

In order to address this problem, the lower slot 134 may include a first inclined surface 1348 that is inclined from the first lower slot wall 1344 to face the first concave surface 1244. The first inclined surface 1348 may be inclined in the same direction that the body 122 is inclined.

In addition, the upper slot 114 may include a second inclined surface 1148 that is inclined from the first upper slot wall 1144 to face the second concave surface 1264. The second inclined surface 1148 may be inclined in the same direction that the body is inclined.

A distance between the first inclined surface 1348 and the lower edge 124 may gradually increase upward. In addition, a distance between the second inclined surface 1148 and the upper edge 126 may gradually increase downward.

The body 122 of the blade 120, the first inclined surface 1348, and the second inclined surface 1148 may be inclined in the same direction. This, however, does not mean that the body 122, the first inclined surface 1348, and the second inclined surface 1148 have the same angle with respect to any one axis.

The first inclined surface 1348 may be formed by cutting an edge formed by meeting of an upper end surface of the hub 130 and the first lower slot wall 1344 adjacent to the first concave surface 1244.

The second inclined surface 1148 may be formed by cutting an edge formed by meeting of a lower end surface of the shroud 110 and the first upper slot wall 1144 adjacent to the second concave surface 1264.

The body 122 of the blade 120 disposed on the lower edge 124 side may be defined as a blade portion formed higher than a height of the first lower slot wall 1344 adjacent to the first concave surface 1244.

A height from an end of the lower edge 124 of the blade 120 to a center of the first concave surface 1244 may be greater than a height of the first lower slot wall 1344 adjacent to the first concave surface.

A height from an end of the upper edge 126 of the blade 120 to a center of the second concave surface 1264 may be greater than or equal to a height of the first upper slot wall 1144 adjacent to the second concave surface.

Meanwhile, when the blade 120 having a spiral shape or a 3D shape is inserted into the slot walls 1144, 1146, 1344, and 1346 in a close contact manner with no spacing, the blade 120 may not be fully inserted into the slot bottoms 1142 and 1342 due to the interference with the slot walls 1144, 1146, 1344, and 1346. When the blade 120 is coupled to a slot part through an adhesive or through welding, a space for the adhesive to permeate or a welding space may be difficult to secure.

Thus, the lower slot walls 1344 and 1346 and the lower edge 124 may be spaced apart from each other. That is, the first lower slot wall 1344 adjacent to the first concave surface 1244 may be spaced apart from the lower edge 124 on the first concave surface 1244 side by a predetermined interval. In addition, the second lower slot wall 1346 adjacent to the first convex surface 1246 may be spaced apart from the lower edge 124 on the first convex surface 1246 side by a predetermined interval.

Similarly, the upper slot walls 1144 and 1146 and the upper edge 126 may be spaced apart from each other. That is, the first lower slot wall 1344 adjacent to the first concave surface may be spaced apart from the lower edge 124 on the first concave surface 1244 side by a predetermined interval. In addition, the second lower slot wall 1346 adjacent to the first convex surface 1246 may be spaced apart from the lower edge 124 on the first convex surface 1246 side by a predetermined interval.

A distance between the first lower slot wall 1344 on the first concave surface 1244 side and the lower edge 124 may be greater than a distance between the second lower slot wall 1346 on the first convex surface 1246 side and the lower edge 124.

A distance between the first upper slot wall 1144 on the second concave surface 1264 side and the upper edge 126 may be greater than a distance between the second upper slot wall 1146 on the second convex surface 1266 side and the upper edge 126.

The distance between the first lower slot wall 1344 and the lower edge 124 may gradually decrease upward. In addition, the distance between the second lower slot wall 1346 and the lower edge 124 may gradually increase upward.

The distance between the first upper slot wall 1144 and the upper edge 126 may gradually decrease downward. In addition, the distance between the second upper slot wall and the upper edge 126 may gradually increase upward.

Meanwhile, when the distance or separation distance is too large, a thickness of the shroud 110 and a thickness of the hub 130 may be decreased to thereby reduce the rigidity. Therefore, a limit on a maximum separation distance is required.

For example, a distance d1 by which one surface of the lower edge 124 formed on the first concave surface 1244 side is spaced apart from the first lower slot wall 1344 may be up to 0.25 mm. In this case, a separation distance d2 by which one surface of the lower edge 124 formed on the first convex surface 1246 side is spaced apart from the second lower slot wall 1346 may be up to 0.2 mm.

For example, a distance d3 by which one surface of the upper edge 126 formed on the second concave surface 1264 side is spaced apart from the first upper slot wall 1144 may be up to 0.25 mm. In this case, a distance d4 by which one surface of the upper edge 126 formed on the second convex surface 1266 side is spaced apart from the second upper slot wall 1146 may be up to 0.2 mm.

The numerical values of the separation distances are provided as preferred examples, and the numerical values of the separation distances are not limited thereto.

When the lower edge 124 and the lower slot walls 1344 and 1346 are spaced apart from each other, and the upper edge 126 and the upper slot walls 1144 and 1146 are spaced apart from each other, interference in the blade 120 is reduced and assemblability is improved compared to the case in which the blade 120 is inserted into the slot walls 1144, 1146, 1344, and 1346 in a close contact manner.

Meanwhile, Table 1 below shows the results of experiments that tested assemblability of the blade 120 by adjusting the depth of the slot part 114 and 134. The minimum thickness of the shroud and the hub is determined according to the depth of the slot part. Based on the shroud and the hub with a thickness of 4 mm, the minimum thickness of the shroud and the hub capable of maintaining the shape of a sheet metal impeller even during a high-speed rotation was found to be 1.6 mm to 2.0 mm.

TABLE 1

| Category | Damage or breakage | Thickness of shroud & Hub/ Mim. thickness |
|---|---|---|
| Case 1 | During a rig test, interference between an outer edge of a shroud and the surrounding area caused impact and abrasion. -> Partial separation of one blade occurred and the shape of an impeller was maintained. | 4.00 mm/1.6 mm |
| Case 2 | During a third PT performance test on a compressor, separation of all blades occurred, and shroud damage occurred. -> Breakage of a blade fitting groove in a shroud occurred, and bending of an upper portion of the shroud occurred. | 4.00 mm/1.4 mm |
| Case 3 | During an overspeed test, separation and damage of a shroud and a blade occurred. | 5.00 mm/0.9 mm |
| Case 4 | During a rig test, separation and damage of a shroud and a blade occurred due to a rapid krpm increase to 24.6 krpm. | 4.00 mm/1.5 mm |
| Case 5 | During an overspeed test, bending (plastic Deformation) of a shroud groove occurred at 10 krpm, so that the test was stopped. | 4.00 mm/1.4 mm |
| Case 6 | During an overspeed test, bending (plastic Deformation) of a shroud groove occurred at 15 krpm, so that the test was stopped. | 4.00 mm/1.0 mm |

Accordingly, a depth h11 of the lower slot 134 may be less than a thickness h1 of the hub 130. More preferably, the depth h11 of the lower slot 134 may be less than or equal to half of the thickness h1 of the hub. The remainder obtained by subtracting the depth h11 of the lower slot 134 from the thickness h1 of the hub 130 is a minimum thickness value h12 of the hub 130, and the minimum thickness value h12 of the hub may be greater than a value of the depth h11 of the lower slot 134.

In addition, a depth h21 of the upper slot 114 may be less than a thickness h2 of the shroud 110. More preferably, the depth h21 of the upper slot 114 may be less than or equal to half of the thickness h2 of the shroud 110. The remainder obtained by subtracting the depth h21 of the upper slot 114 from the thickness h2 of the shroud 110 is a minimum thickness value h22 of the shroud 110, and the minimum thickness value h22 of the shroud may be greater than a value of the depth h21 of the upper slot 114.

Meanwhile, the minimum thickness value h22 of the shroud 110 may be greater than or equal to 1.6 mm. However, the minimum thickness value h22 of the shroud is not limited thereto.

When the thickness of the blade 120 is too thick, the depth of the slot part 114 and 134 should be increased to prevent the separation of the blade. However, when the depth of the slot part becomes too deep, the rigidity of the shroud 110 and the hub 130 is affected or reduced.

Accordingly, the thickness of the hub 130 may be greater than the thickness of the blade 120. More preferably, the thickness of the hub 130 may be at least twice the thickness of the blade 120.

Also, the thickness of the shroud 110 may be greater than the thickness of the blade 120. More preferably, the thickness of the shroud 110 may be at least twice the thickness of the blade 120.

Figure 9:
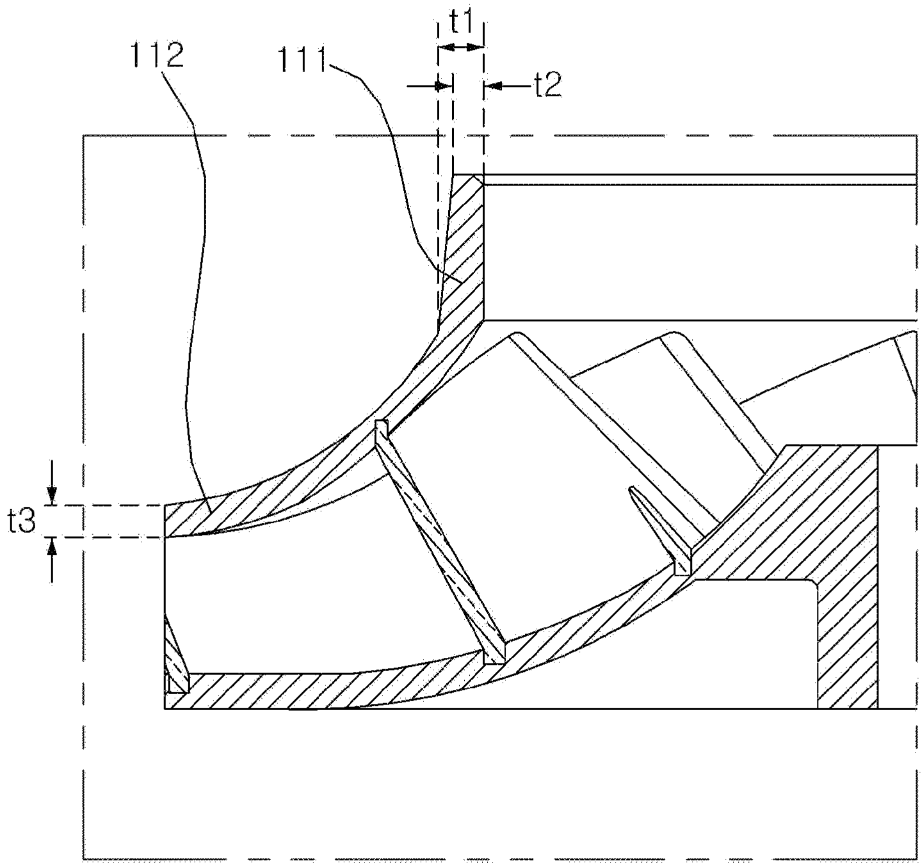
FIG. 9 is a cross-sectional view illustrating a portion of the impeller of FIG. 6.

Hereinafter, the inlet portion 111 formed at the shroud 110 will be described with reference to FIG. 9.

A thickness t2 to a thickness t1 (t2~t1) of the inlet portion 111 formed at the shroud 110 may be greater than a thickness t3 of the shroud body 112. A minimum thickness t2 of the inlet portion 111 may be greater than or equal to the thickness t3 of the shroud body 112.

The thickness t2 to the thickness t1 (t2~t1) of the inlet portion 111 may gradually increase from the inlet portion 111 to the shroud body 112. For example, the thickness t1 of a lower end of the inlet portion may be greater than the thickness t2 of an upper end of the inlet portion 111, and may become or reach the thickness t3 of the shroud body while defining a curved surface convexly curved downward from the lower end of the inlet portion.

In the following, the results of comparison between an impeller designed with an existing method and an impeller of the present disclosure designed to have reinforced structural rigidity are shown in Table 2 below. In the case of the conventional impeller, the maximum stress applied to a shroud exceeded the yield stress, which resulted in breakage, and the impeller designed according to the conditions of the present disclosure described above exhibited the improved yield strength and safety factor of 1.8, and accordingly, breakage did not occur.

TABLE 2

| | Existing design (Conventional impeller) (Breakage) | Improved design (Impeller of the present Disclosure) |
|---|---|---|
| Safety factor | 0.95 | 1.8 |
| Shroud maximum stress/ Yield stress (MPa) | 289/275 | 280/505 |
| Thickness (mm) | Shroud: 4<br>Hub: 4<br>Blade: 2.1 | Shroud: 4<br>Hub: 4<br>Blade: 2 |
| Max. depth of slot (mm) | 2.6 | 1.7 |
| Min. thickness of shroud (mm) | 1.4 | 2.3 |
| Surface shape of shroud | Rib excluded | Rib included |
| Material of shroud | A6061-T6 | A7075-T6 |
| Blade coupling structure | Due to slots being in close contact with blades, interference occurred, inhibiting the blades from being fully inserted into the slots. | d1 & d3: 0.25 mm<br>d2 & d4: 0.2 mm |

In Table 3 below, the results of an overspeed test on the impeller of the present disclosure with reinforced structural rigidity are shown. During the test, an rpm was increased by 1,000 rpm from 17,000 rpm to measure the average diameter based on an outer diameter of the inlet portion 111 of the shroud 110 and an outer diameter of an outlet side of the shroud 110, and each rpm was continued for two minutes.

According to the test results, the impeller passed the over-speed test up to 23,000 rpm without deformation except slight thermal deformation due to heat conduction from the motor.

TABLE 3

| Shroud outer diameter at inlet side | | | | |
|---|---|---|---|---|
| kRPM | Measuring point 1 | Measuring point 2 | Average diameter | Amount of change |
| 0 | 146.485 | 146.475 | 146.48 | |
| 17 | 146.52 | 146.52 | 146.52 | 0.04 |
| 18 | 146.535 | 146.535 | 146.535 | 0.015 |
| 19 | 146.55 | 146.545 | 146.548 | 0.013 |
| 20 | 146.555 | 146.55 | 146.553 | 0.005 |
| 21 | 146.56 | 146.56 | 146.56 | 0.007 |
| 22 | 146.575 | 146.575 | 146.575 | 0.015 |
| 23 | 146.585 | 146.58 | 146.583 | 0.008 |
| 24 | 146.54 | 146.535 | 146.538 | |
| 0 | 222.98 | 222.98 | 222.98 | |
| 17 | 223.03 | 223.04 | 223.035 | 0.055 |
| 18 | 223.065 | 223.065 | 223.065 | 0.03 |
| 19 | 223.085 | 223.08 | 223.083 | 0.018 |
| 20 | 223.1 | 223.095 | 223.098 | 0.015 |
| 21 | 223.12 | 223.11 | 223.115 | 0.018 |
| 22 | 223.135 | 223.135 | 223.135 | 0.02 |
| 23 | 223.17 | 223.17 | 223.17 | 0.035 |
| 24 | 223.1 | 223.1 | 223.1 | |

Although preferred embodiments of the present disclosure have been shown and described herein, the present disclosure is not limited to the specific embodiments described above. It will be understood that various modifications and changes can be made by those skilled in the art without departing from the idea and scope of the present disclosure as defined by the appended claims. Therefore, it shall be considered that such modifications, changes, and equivalents thereof are all included within the scope of the present disclosure.

The invention claimed is:

1. An impeller, comprising:

a shroud provided with a plurality of upper slots of a spiral shape;

a hub disposed opposite the shroud; and a plurality of blades connected to the hub and inserted into the respective plurality of upper slots to be coupled to the shroud, the plurality of blades each having a first side, and a second side formed on an opposite side of the first side, wherein the hub is provided with a plurality of lower slots of a spiral shape, wherein the plurality of blades each further comprises:

a body formed to be inclined with respect to an axial direction of the impeller;

a lower edge bent in the axial direction toward the hub from the body to define a first concave surface on the first side thereof and a first convex surface on the second side thereof, the lower edge being inserted into one of the plurality of lower slots to be coupled to the hub; and an upper edge bent from the body in the axial direction toward the shroud to define a second concave surface on the second side thereof and a second convex surface on the first side thereof, and wherein the plurality of upper slots each comprises:

an upper slot bottom defining a space into which the upper edge is inserted;

an upper slot wall divided into a first upper slot wall disposed on a second concave surface side and a second upper slot wall disposed on a second convex surface side; and a second inclined surface inclined from the first upper slot wall to face the second concave surface.

2. The impeller of claim 1, wherein a distance between the second inclined surface and the upper edge gradually increases in the axial direction toward the hub.

3. The impeller of claim 1, wherein the upper slot wall and the upper edge are spaced apart from each other by a predetermined interval.

4. The impeller of claim 3, wherein a distance between the first upper slot wall and the upper edge is greater than a distance between the second upper slot wall and the upper edge.

5. The impeller of claim 4, wherein the distance between the first upper slot wall and the upper edge gradually decreases in the axial direction toward the hub, and wherein the distance between the second upper slot wall and the upper edge gradually increases in the axial direction toward the shroud.

6. The impeller of claim 4, wherein the distance between the first upper slot wall and the upper edge is less than or equal to 0.25 mm, and wherein the distance between the second upper slot wall and the upper edge is less than or equal to 0.2 mm.

7. The impeller of claim 1, wherein the plurality of lower slots each comprises:

a lower slot bottom defining a space into which the lower edge is inserted;

a lower slot wall divided into a first lower slot wall disposed on a first concave surface side and a second lower slot wall disposed on a first convex surface side; and a first inclined surface inclined from the first lower slot wall to face the first concave surface.

8. The impeller of claim 7, wherein a distance between the first inclined surface and the lower edge gradually increases in the axial direction toward the shroud.

9. The impeller of claim 7, wherein the lower slot wall and the lower edge are spaced apart from each other by a predetermined interval.

10. The impeller of claim 9, wherein a distance between the first lower slot wall and the lower edge is greater than a distance between the second lower slot wall and the lower edge.

11. The impeller of claim 10, wherein the distance between the first lower slot wall and the lower edge gradually decreases in the axial direction toward the shroud, and wherein the distance between the second lower slot wall and the lower edge gradually increases toward upward.

12. The impeller of claim 10, wherein the distance between the first lower slot wall and the lower edge is less than or equal to 0.25 mm, and wherein the distance between the second lower slot wall and the lower edge is less than or equal to 0.2 mm.

13. The impeller of claim 1, wherein a thickness of the shroud is greater than a thickness of each of the plurality of blades.

14. The impeller of claim 13, wherein the thickness of the shroud is at least twice the thickness of each of the plurality of blades.

15. The impeller of claim 1, wherein a depth of each of the plurality of upper slots is less than or equal to half a thickness of the shroud.

16. The impeller of claim 1, wherein the shroud has a minimum thickness of 1.6 mm or more.

17. The impeller of claim 1, wherein the shroud comprises at least one or more ribs spaced apart from each other in a circle on an upper surface thereof.

18. The impeller of claim 1, wherein the shroud comprises:

a shroud body defining a body of the shroud; and an inlet portion through which air is introduced and having a thickness greater than a thickness of the shroud body.

19. The impeller of claim 18, wherein the inlet portion becomes thicker toward the shroud body.

* * * * *